(12) United States Patent
Choi et al.

(10) Patent No.: US 7,012,752 B2
(45) Date of Patent: Mar. 14, 2006

(54) TUNABLE-WAVELENGTH OPTICAL FILTER AND METHOD OF MANUFACTURING THE SAME

(75) Inventors: Chang Auck Choi, Daejon-Shi (KR); Myung Lae Lee, Daejon-Shi (KR); Chang Kyu Kim, Daejon-Shi (KR); Chi Hoon Jun, Daejon-Shi (KR); Youn Tae Kim, Daejon-Shi (KR)

(73) Assignee: Electronics and Telecommunications Research Institue, (KR)

( * ) Notice: Subject to any disclaimer, the term of this patent is extended or adjusted under 35 U.S.C. 154(b) by 0 days.

(21) Appl. No.: 11/045,554

(22) Filed: Jan. 27, 2005

(65) Prior Publication Data

US 2005/0157392 A1 Jul. 21, 2005

Related U.S. Application Data

(62) Division of application No. 10/671,825, filed on Sep. 25, 2003.

(30) Foreign Application Priority Data

Dec. 10, 2002 (KR) ................................ 2002-78443

(51) Int. Cl.
*G02B 27/00* (2006.01)

(52) U.S. Cl. ...................... 359/578; 359/577; 359/587; 359/589

(58) Field of Classification Search ................ 359/578, 359/579, 585, 577, 587, 589, 290, 291
See application file for complete search history.

(56) References Cited

U.S. PATENT DOCUMENTS 5,561,523 A 10/1996 Blomberg et al.

(Continued)

OTHER PUBLICATIONS

J. Peerlings, et al., "Long Resonator Micromachined Tunable GaAs-AIAs Fabry-Perot Filter"; IEEE Photonics Tech. Ltr., vol. 9, No. 9, Sep. 1997 (pp. 1235-1237).

*Primary Examiner*—Fayez G. Assaf
(74) *Attorney, Agent, or Firm*—Blakely Sokoloff Taylor & Zafman (57) ABSTRACT

An active type tunable wavelength optical filter having a Fabry-Perot structure is disclosed. A tunable wavelength optical filter which comprises a lower mirror in which silicon films and oxide films are sequentially laminated in a multi-layer and the silicon film is laminated on the highest portion; an upper mirror in which silicon films and oxide films are sequentially laminated in a multi-layer and the silicon film is laminated on the highest portion and which is spaced away from the lower mirror by a predetermined distance; a connecting means for connecting and supporting the lower mirror and the upper mirror to a semiconductor substrate; and electrode pads for controlling the gap between the lower mirror and the upper mirror by an electrostatic force and the method of manufacturing the same are provided. Thereby, by finely driving the upper and lower mirrors composed of a multi-layer structure of the silicon film and the oxide film by the electrostatic force, the wavelength of the transmitted light with respect to the incident light can be selectively sent.

12 Claims, 7 Drawing Sheets

U.S. PATENT DOCUMENTS

| | | |
|---|---|---|
| 6,304,689 B1 | 10/2001 | Dingel et al. |
| 6,341,039 B1 | 1/2002 | Flanders et al. |
| 6,373,632 B1 | 4/2002 | Flanders |
| 6,724,785 B1 * | 4/2004 | Tucker et al. ............... 372/20 |
| 6,822,779 B1 * | 11/2004 | Chi .......................... 359/290 |
| 2003/0174952 A1 * | 9/2003 | Fan .......................... 385/39 |
| 2005/0052746 A1 * | 3/2005 | Shih et al. ................. 359/578 |

* cited by examiner

TUNABLE-WAVELENGTH OPTICAL FILTER AND METHOD OF MANUFACTURING THE SAME

The present patent application is a Divisional of Application No. 10/671,825, filed Sep. 25, 2003.

BACKGROUND OF THE INVENTION

1. Field of the Invention

The present invention relates to a tunable wavelength optical filter, more particularly, to an active type tunable wavelength optical filter having a Fabry-Perot structure.

2. Description of the Prior Art

Among micro electromechanical systems (MEMS) based on a semiconductor process technique, an active type optical filter for wavelength division multiplexing (WDM) is applied to an optical communication. Recently, it is used in an optical signal dividing and multiplexing device for a massive information network such as Internet. Such optical filter has a function of dividing an input signal, which is in an optical wavelength multiplexing transmitting method, into output signals by the wavelength region. Particularly, in order to implement a dynamic WDM system, it is a key to manufacture the active type tunable wavelength optical filter operated at a high speed. Various techniques of manufacturing the tunable wavelength filter for implementing the dynamic WDM system were suggested. But, among them, in case of a piezo-electric transducer filter of adjusting a gap between two pairs of Fabry-Perot micro-mirrors by a piezo material, it has a limitation in the application thereof, because of the physical instability of a used material and a slow response characteristics. In addition, a Mach-Zender optical filter using an optical interference phenomenon is accomplished by manufacturing an optical waveguide and a phase modulator on a semiconductor substrate, but has a problem that the structure thereof is complicated and it is difficult to manufacture that. In order to improve the previous method of manufacturing the filter, the active type tunable wavelength filter having the MEMS structure of which the response speed is relatively quick and the manufacture technique is easy as the semiconductor process technique has been suggested.

On the other hand, in a piezo-type FP filter or a tunable filter having a Fiber Bragg Grating carved in an optical fiber, which is currently commercial, since a tuning speed is slow at the level of msec or the tunable wavelength band is narrow, it is impossible to use that to the active type network device. However, the MEMS type tunable filter using an electrostatic force as a driving source accomplishes the response speed below few tens microsecond ($\mu s$) and the tunable wavelength band of the order of 100 nm, thereby it can be applied to the current optical communication system. However, the MEMS type tunable filter of gallium-arsenide substrate suggested currently has problems that a consistent process can not be performed like the silicon wafer process due to difficulties of the manufacturing process and the packaging technique.

SUMMARY OF THE INVENTION

Thus the object of the present invention is to provide an active type tunable wavelength optical filter having a Fabry-Perot structure which uses a mirror having a high reflexibility and having a multi-layer structure of silicon films and oxide films.

The other object of the present invention is to provide an active type tunable wavelength optical filter having a Fabry-Perot structure which a silicon semiconductor process technique is used, the process thereof is simple, and it is possible to the mass production.

In order to solve the above-mentioned problems, according to an aspect of the present invention, a tunable wavelength optical filter comprising a lower mirror in which silicon films and oxide films are sequentially laminated in a multi-layer and the silicon film is laminated on the highest portion; an upper mirror in which silicon films and oxide films are sequentially laminated in a multi-layer and the silicon film is laminated on the highest portion and which is spaced away from the lower mirror by a predetermined distance; a connecting means for connecting and supporting the lower mirror and the upper mirror to a semiconductor substrate; and electrode pads for controlling the gap between the lower mirror and the upper mirror by an electrostatic force is provided.

According to the other aspect of the present invention, a method of manufacturing a tunable wavelength optical filter which comprises the steps of (a) forming a first sacrificial oxide film for floating a lower mirror on a semiconductor substrate; (b) sequentially laminating conductive silicon films and oxide films for defining a mirror region on the first sacrificial oxide film in a multi-layer and laminating another conductive silicon film to form a lower mirror; (c) forming a second sacrificial film on the resultant; (d) sequentially laminating conductive silicon films and oxide films for defining the mirror region on the second sacrificial oxide film in a multi-layer and laminating another conductive silicon film to form an upper mirror; (e) etching the rear side of the semiconductor substrate to form an opening for inserting an optical fiber thereinto; (f) forming electrode pads for controlling the gap, between the lower mirror and the upper mirror by an electrostatic force; (g) etching the silicon film around the upper mirror in a dry etching method to expose the second sacrificial oxide film, such that the upper mirror is suspended by a connecting means; and (h) forming an optical tuning space between the lower mirror and the upper mirror and etching the first sacrificial oxide film and the second sacrificial oxide film such that the lower mirror is floated on the semiconductor substrate is provided.

According to the further other aspect of the present invention, a method of manufacturing a tunable wavelength optical filter which comprises the steps of (a) forming a sacrificial oxide film for floating a mirror on a semiconductor substrate; (b) sequentially laminating conductive silicon films and oxide films for defining a mirror region on the sacrificial oxide film in a multi-layer and laminating another conductive silicon film to form a mirror; (c) etching the rear side of the semiconductor substrate to form an opening for inserting an optical fiber thereinto; (d) forming electrode pads for controlling the gap between the mirrors by an electrostatic force; (e) etching the silicon film around the mirror in a dry etching method to expose the sacrificial oxide film, such that the mirror is suspended by a connecting means; and (f) etching the sacrificial oxide film such that the mirror is floated on the semiconductor substrate, wherein two semiconductor substrate formed by the steps (a) to (f) are prepared and are attached to each other through a spacer layer therebetween so that the mirrors of the semiconductor substrates are opposite to each other is provided.

DESCRIPTION OF THE PREFERRED EMBODIMENT

Hereinafter, the preferred embodiments of the present invention will be explained with reference to the accompanying drawings. However, the embodiment of the present invention can be changed into a various type, and it should be not understood that the scope of the present invention is limit to the following embodiments. The embodiments of the present invention are provided in order to explain the present invention to those skilled in the art. When describing that a certain layer is laid on the other layer in the below-mentioned explanation, the certain layer may be laid just on the other layer or may be laid on the other layer sandwiching a third layer. In addition, in the drawings, the thickness or the size of each layer is exaggerated for the convenience and the clearness of the explanation. In the drawings, a same reference numeral indicates a same element.

Figure 1:
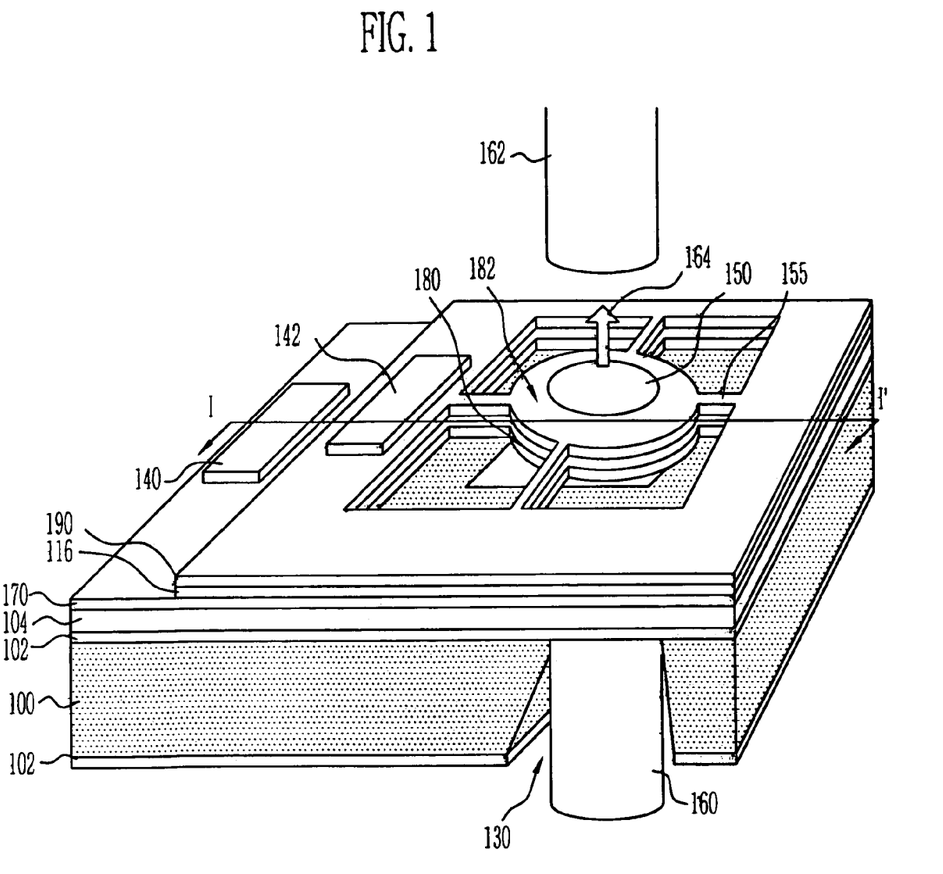
FIG. 1 shows an active type tunable wavelength optical filter having a Fabry-Perot structure according to a preferred embodiment of the present invention.

FIG. 1 shows an active type tunable wavelength optical filter having a Fabry-Perot structure according to a preferred embodiment of the present invention.

Referring to FIG. 1, the active type tunable wavelength optical filter having a Fabry-Perot structure according to the preferred embodiment of the present invention, comprises a lower mirror 180 in which silicon films and silicon oxide films are sequentially laminated in a multi-layer shape and the silicon film is laminated in the highest portion, an upper mirror 182 which is spaced away from the lower mirror 180 by a predetermined distance in which silicon films and silicon oxide films are sequentially laminated in a multi-layer shape and the silicon film is laminated in the highest portion, a connecting means 155 for connecting and supporting the lower mirror 180 and the upper mirror 182 to a semiconductor substrate 100, and electrode pads 140, 142 for controlling the gap between the lower mirror 180 and the upper mirror 182 by an electrostatic force.

The lower mirror 180 is spaced away from the semiconductor substrate 100 by a predetermined distance and is floated on the semiconductor substrate, and an opening 130 for inserting an optical fiber thereinto is provided on the rear side of the semiconductor substrate 100 corresponding to the mirror region 150.

The electrode pads 140, 142 are electrically connected with the silicon film of the highest film in the lower mirror 180 and the silicon film of the highest film in the upper mirror 182, respectively.

It is preferable that the lower mirror 180 and the upper mirror 182 are symmetrical to each other and have a circular plate shaped structure.

A sacrificial oxide film 104 is provided between the semiconductor substrate 100 and a lower silicon film 170 around the lower mirror 180 and the upper mirror 182, and the peripheral region of the lower and upper mirrors is opened so as to expose the semiconductor substrate 100.

Hereinafter, this will be further explained. The two spaced flat mirrors 180, 182 are suspended by a torsion bar or a spring 155 and comprise the lower mirror 180 and the upper mirror 182 having the structure of laminating the silicon film/silicon oxide film. The two mirrors 180, 182 have a function of finely adjusting the spaced distance by an electrostatic force due to the voltage applied to the electrode pads 140, 142 formed on the lower silicon film 170 and the upper silicon film 190 each having the structure of laminating the silicon. A first sacrificial oxide film 104 for floating the two mirrors 180, 182 from the surface of the semiconductor substrate 100 is provided between the semiconductor substrate 100 and the lower silicon film 170. Also, a second sacrificial film 116 for adjusting the gap between the mirrors deposited for forming an optical tuning space of the two mirrors is provided between the lower silicon film 170 and the upper silicon film 190. Signal light having a multi-wavelength, which is output from the optical fiber 160 inserted into an opening 130 in the rear side of the semiconductor substrate 100, is transmitted to a transmitting optical fiber 162 after filtering the wavelength of transmitting light by adjusting the micro-distance between the two spaced mirrors 180, 182 when passing through the two mirrors 180, 182.

FIGS. 2 to 19 are cross sectional views illustrating a method of manufacturing the active type tunable wavelength optical filter having the Fabry-Perot structure. FIGS. 2 to 19 are cross sectional views along to the line I–I' in FIG. 1.

Figure 2:
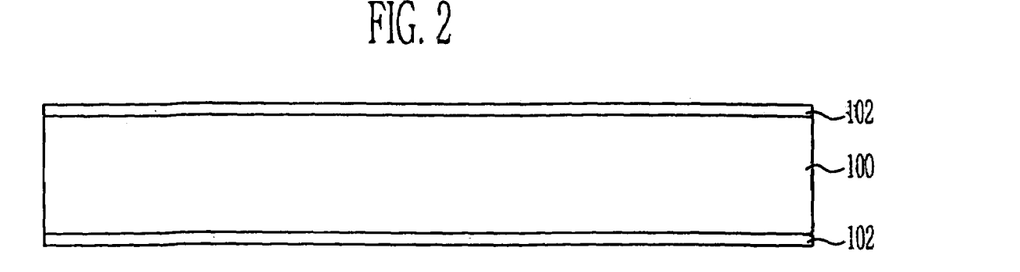
FIGS. 2 to 19 are cross sectional views illustrating a method of manufacturing the active type tunable wavelength optical filter having the Fabry-Perot structure.

Referring to FIG. 2, thermal oxide films 102 are grown on the both polished sides of a semiconductor substrate 100 by a thermal oxide process. The thermal oxide film 102 is grown so as to have a thickness of 6000 Å. The thermal oxide 102 may be formed at a temperature of 950–1100° C. in the oxygen atmosphere. The semiconductor substrate 100 has a thickness of 350–400 $\mu$m. The semiconductor substrate 100 may be a silicon substrate or a quartz substrate.

Figure 3:
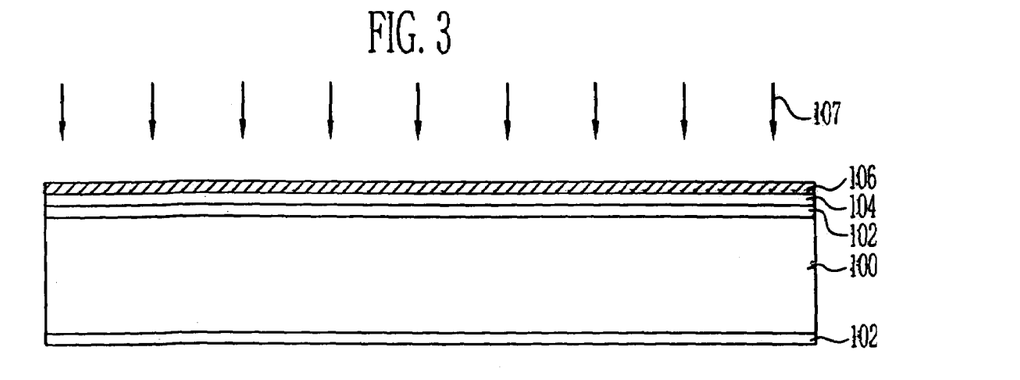

Referring to FIG. 3, a sacrificial oxide film 104 is formed on any one surface of the semiconductor substrate 100 on which the thermal oxide films 102 are formed. It is preferable that the first sacrificial oxide film 104 has a thickness of 2–3 $\mu$m. The first sacrificial oxide film 104 may be formed by a PECVD (Plasma Enhanced Chemical Vapor Deposition) method, at a pressure of 1.5 Torr and a temperature of 300° C. in the atmosphere of mixing $SiH_4$ gas of 15 sccm, $N_2O$ gas of 1000 sccm, and $N_2$ gas of 600 sccm.

Subsequently, a first silicon film 106 of single crystal or polycrystal is deposited on the sacrificial oxide film 104. It is preferable that the first silicon film 106 is deposited so as to have a predetermined thickness, for example, a thickness of $d=(2m+1)\lambda/4n$ (m=0, 1, 2, ... ). Here, d is the deposited thickness, $\lambda$ is the wavelength of the light source, and n is an optical refractive index of the deposited thin film (silicon film). The first silicon film 106 may be formed by a LPCVD (Low Pressure Chemical Vapor Deposition) method using $SiH_4$ gas of 140–200 sccm, at a pressure of 280 mTorr and a temperature of 625° C. Next, for electrical connection, a process of doping $POCl_3$ or a process of injecting ions such as phosphorus 107 into the laminated first silicon film 106 is performed.

Figure 4:
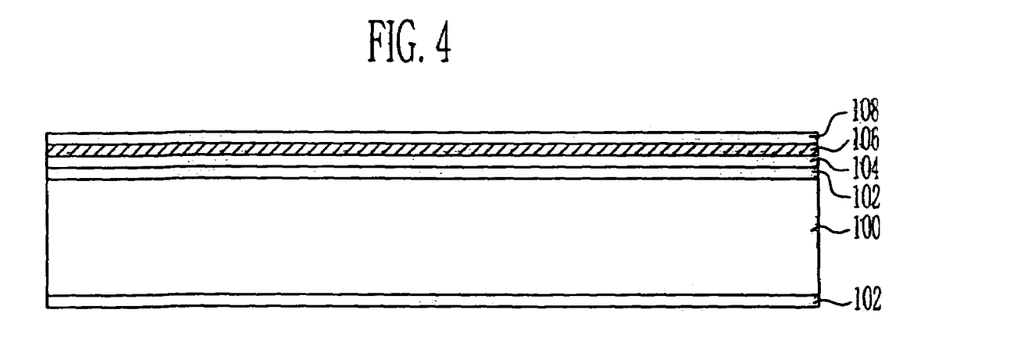

Referring to FIG. 4, a silicon oxide film 108 is deposited on the first silicon film 106. The first silicon oxide film 108 is to form the lower mirror 180 having the laminated structure of the silicon film and the silicon oxide film. It is preferable that the first silicon oxide film 108 is deposited so as to have a predetermined thickness, for example, a thickness of $d=(2m+1)\lambda/4n$ (m=0, 1, 2, ... ). Here, d is the deposited thickness, $\lambda$ is the wavelength of the light source, and n is an optical reflectivity of the deposited thin film (silicon oxide film). The first silicon oxide film 108 may be formed by a LPCVD (Low Pressure Chemical Vapor Deposition) method using TEOS (Tetra Ethyl Ortho Silicate) of 200 sccm, at a pressure of 350 mTorr and a temperature of 710–720° C.

Figure 5:
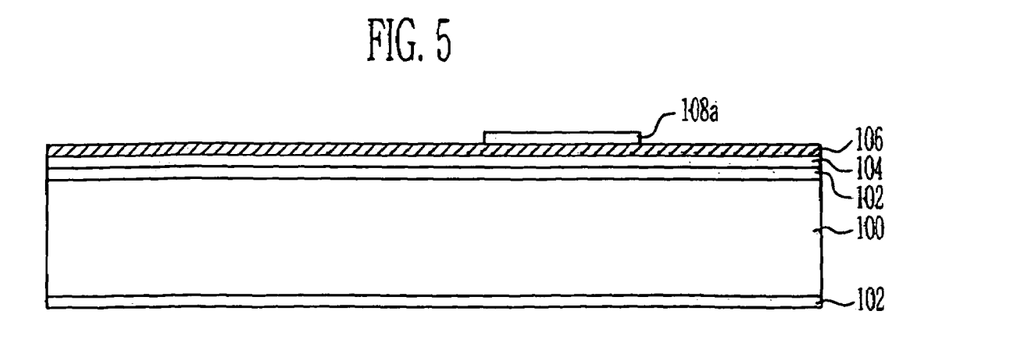

Referring to FIG. 5, the first silicon oxide film 108 is patterned to form a first silicon oxide film pattern 108a. The first silicon oxide film pattern 108a defines a mirror region 150. For example, in case where the mirror region (See '150' in FIG. 1) has a circular plate shaped structure, the first silicon oxide film pattern 108a has the circular plate shaped structure, similar to the mirror region 150.

Figure 6:
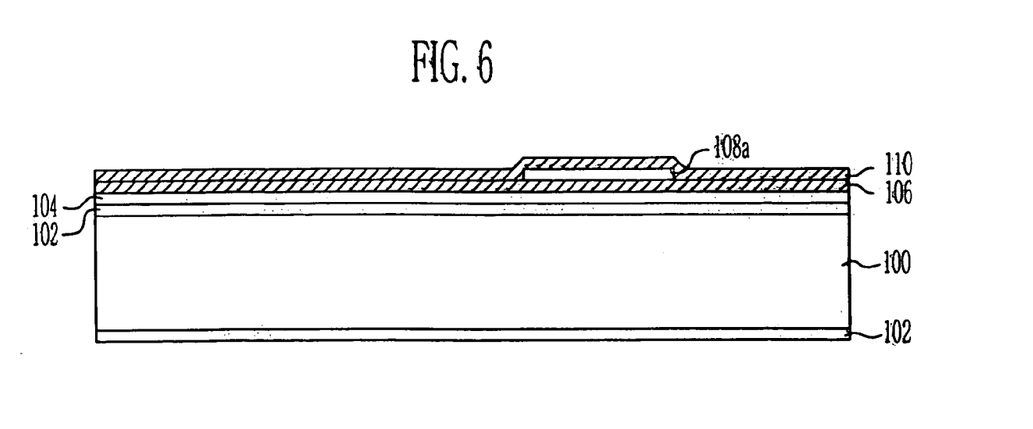

Referring to FIG. 6, a second silicon film 110 having a predetermined thickness is deposited on the semiconductor substrate 100 on which the first silicon oxide film pattern 108a is formed. It is preferable that the second silicon film 110 is deposited so as to have a predetermined thickness, for example, a thickness of $d=(2m+1)\lambda/4n$ (m=0, 1, 2, . . . ). Here, d is the deposited thickness, $\lambda$ is the wavelength of the light source, and n is an optical refractive index of the deposited thin film (the second silicon film). The second silicon film 110 may be formed by a LPCVD (Low Pressure Chemical Vapor Deposition) method using $SiH_4$ gas of 140–200 sccm, at a pressure of 280 mTorr and a temperature of 625° C.

Figure 7:
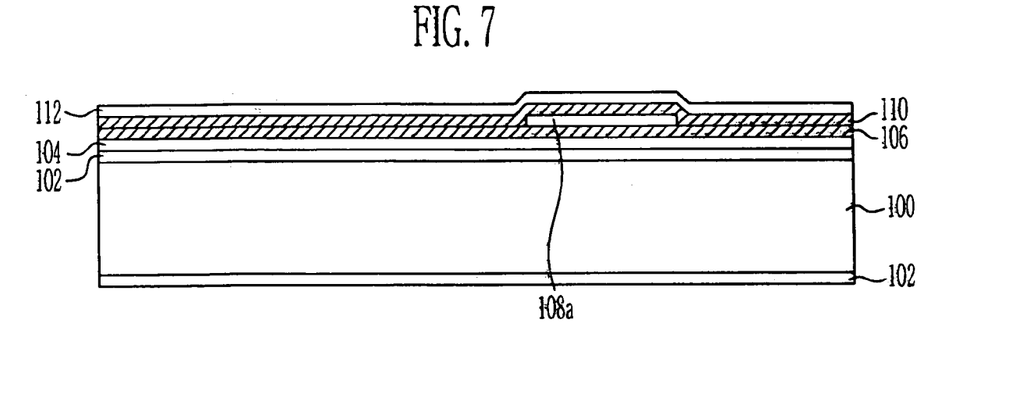

Referring to FIG. 7, a second silicon oxide film 112 having a predetermined thickness is deposited on the second silicon film 110. It is preferable that the second silicon oxide film 112 is deposited so as to have a predetermined thickness, for example, a thickness of $d=(2m+1)\lambda/4n$ (m=0, 1, 2, . . . ). Here, d is the deposited thickness, t is the wavelength of the light source, and n is an optical refractive index of the deposited thin film (silicon oxide film). The second silicon oxide film 112 may be formed by the same method as the method of forming the first silicon oxide film 108.

Figure 8:
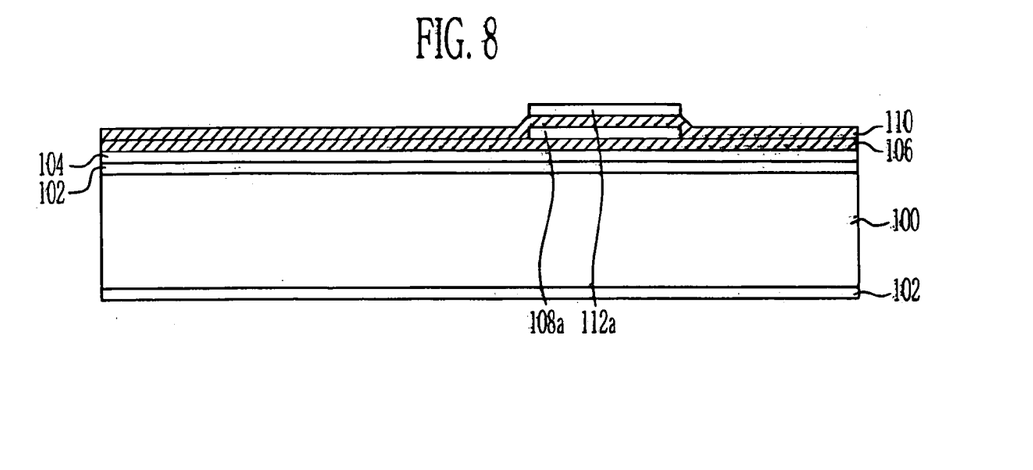

Referring to FIG. 8, the second silicon oxide film 112 is patterned to form a second silicon oxide film pattern 112a. The second silicon oxide film pattern 112a defines the mirror region. For example, in case where the mirror region (See '150' in FIG. 1) has a circular plate shaped structure, the second silicon oxide film pattern 112a has a circular plate shaped structure similar to the mirror region 150.

Figure 9:
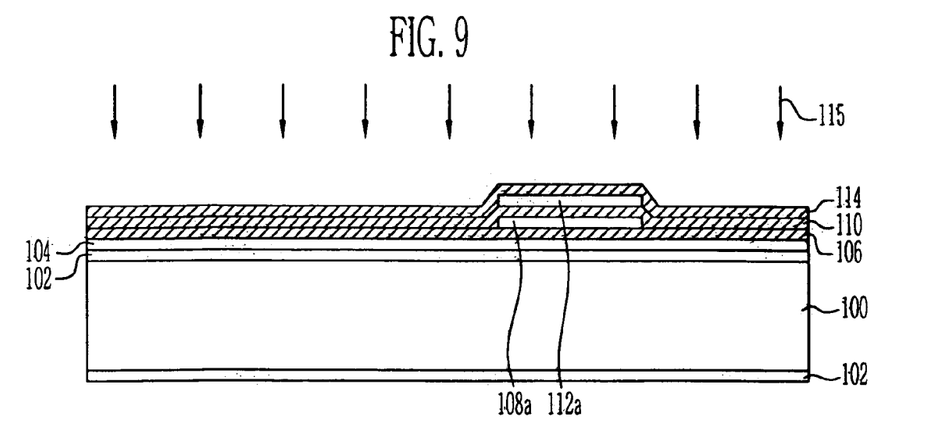

Referring to FIG. 9, a third silicon film 114, is deposited on the semiconductor substrate 100 on which the second silicon oxide film pattern 112a is formed. Subsequently, for electrical connection, a process of doping $POCl_3$ or a process of injecting ions such as phosphorus 115 into the laminated silicon film 114 is performed.

On the other hand, in order to increase the optical reflectivity of the lower mirror 180 having the laminated structure of the silicon film and the silicon oxide film, if necessary, before the third silicon film 114 is formed, the silicon film and the silicon oxide film may be further laminated as need by the same method as the above-mentioned method.

Figure 10:
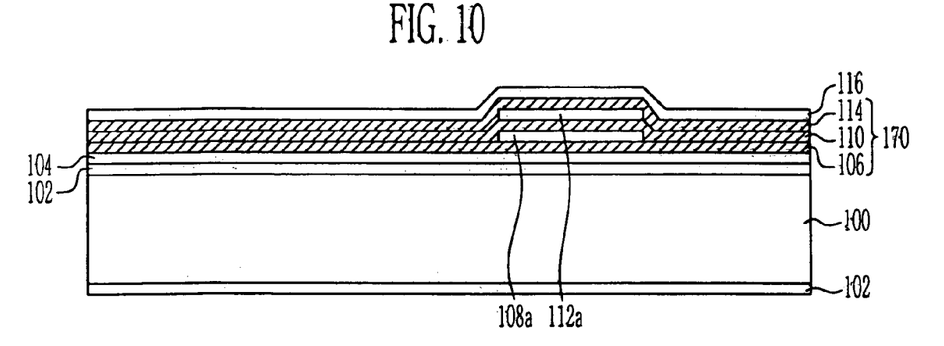

Referring to FIG. 10, in order to form the optical tuning space between the lower mirror 180 and the upper mirror 182, a second sacrificial oxide film 116 is deposited by the thickness of the tuning space. It is preferable that the second sacrificial oxide film 116 is formed by a thickness capable of adjusting the spaced distance between the upper mirror 182 and the lower mirror 180 by the electrostatic force due to the applied voltage, for example, 2–3 $\mu$m. The second sacrificial oxide film may be formed by a PECVD (Plasma Enhanced Chemical Vapor Deposition) method using $SiH_4$ gas of 60 sccm and $N_2O$ gas of 1000 sccm, at a pressure of 3 Torr and a temperature of 300° C.

Subsequently, an upper mirror 182 having a laminated structure symmetrical to the lower mirror 180 is formed on the second sacrificial oxide film 116. Hereinafter, the steps of forming the upper mirror 182 will be explained.

Figure 11:
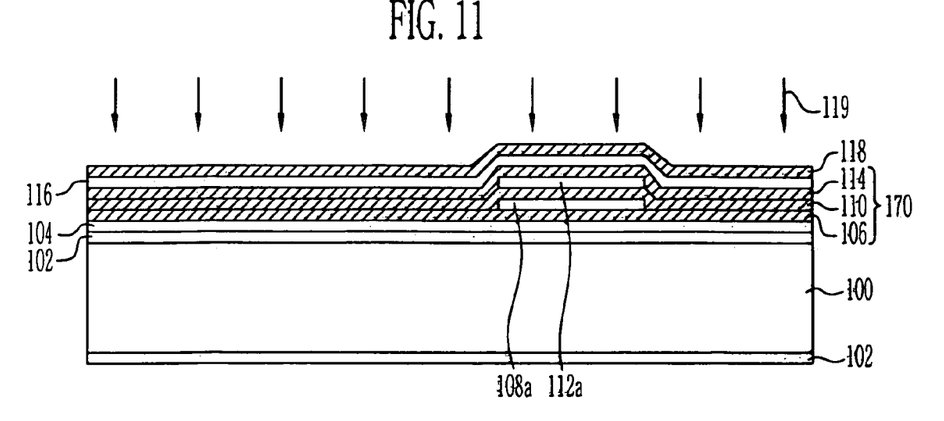

Referring to FIG. 11, first, a fourth silicon film 118 is deposited, and, for electrical connection, a process of doping $POCl_3$ or a process of injecting ions such as phosphorus 119 into the laminated fourth silicon film 118 is performed. It is preferable that the fourth silicon film 118 is formed by a same thickness and a same method as the first silicon film 106 in the lower mirror 180.

Figure 12:
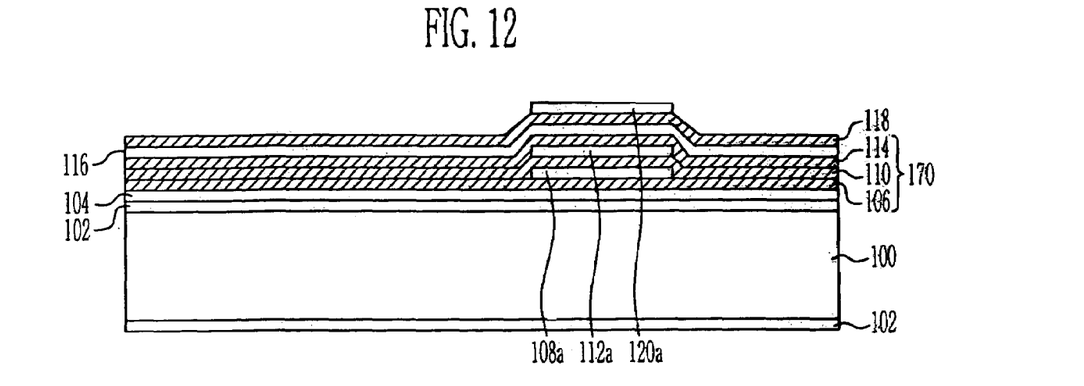

Referring to FIG. 12, a fourth silicon oxide film is deposited on the fourth silicon film 118, and then is patterned to form the fourth silicon oxide film pattern 120a. It is preferable that the fourth silicon oxide film is formed by a same thickness and a same method as the first silicon oxide film 108 in the lower mirror 180. The fourth silicon oxide film pattern 120a defines the mirror region (See '150' in FIG. 1).

Figure 13:
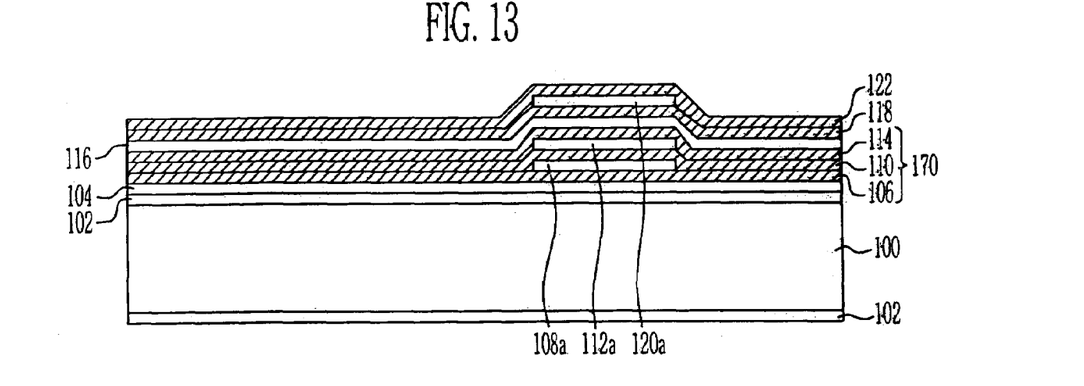

Referring to FIG. 13, a fifth silicon film 122 is deposited on the semiconductor substrate 100 on which the fourth silicon oxide film pattern 120a is formed. It is preferable that the fifth silicon film 122 is formed by a same thickness and a same method as the second silicon film 110 in the lower mirror 180.

Figure 14:
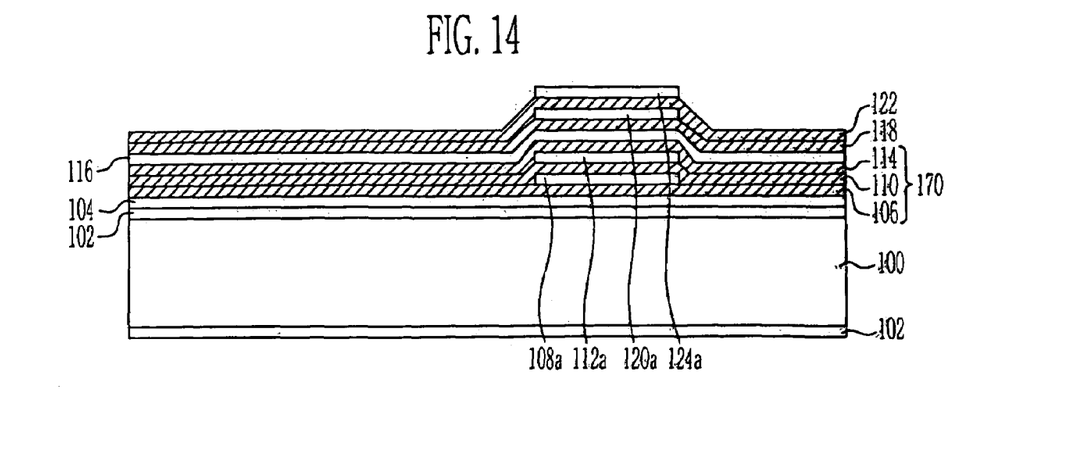

Referring to FIG. 14, a fifth silicon oxide film is deposited on the fifth silicon film 122, and then is patterned to form the fifth silicon oxide film pattern 124a. It is preferable that the fifth silicon oxide film is formed by a same thickness as the second silicon oxide film 112. The fifth silicon oxide film pattern 124a defines the mirror region (See '150' in FIG. 1).

Figure 15:
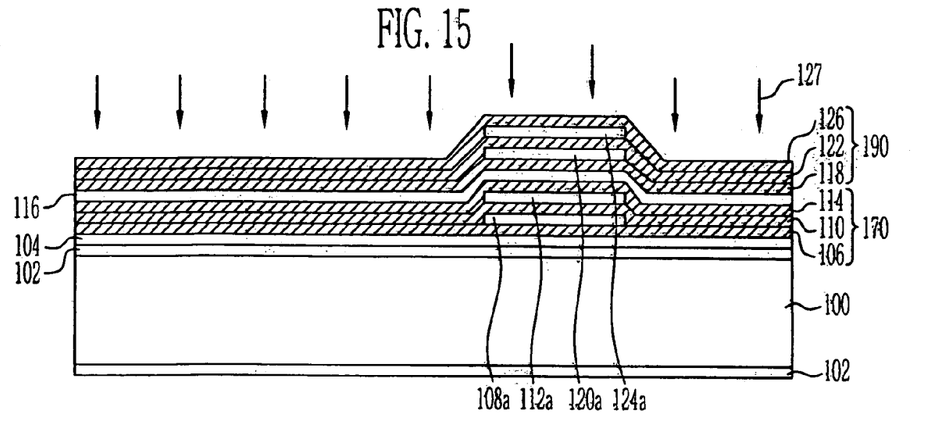

Referring to FIG. 15, a sixth silicon film 126 is deposited on the semiconductor substrate 100 on which the fifth silicon oxide film pattern 124a is performed, and a process of doping $POCl_3$ or a process of injecting ions such as phosphorus 127 thereinto is performed. It is preferable that the sixth silicon film 126 is formed by a same thickness and a same method as the third silicon film 114 of the lower mirror 180.

On the other band, in order to increase the optical reflectivity of the upper mirror 182 having the laminated structure of the silicon film and the silicon oxide film, if necessary, before the sixth silicon film 126 is formed, the silicon film and the silicon oxide film may be further laminated as need by the same method as the above-mentioned method.

Figure 16:
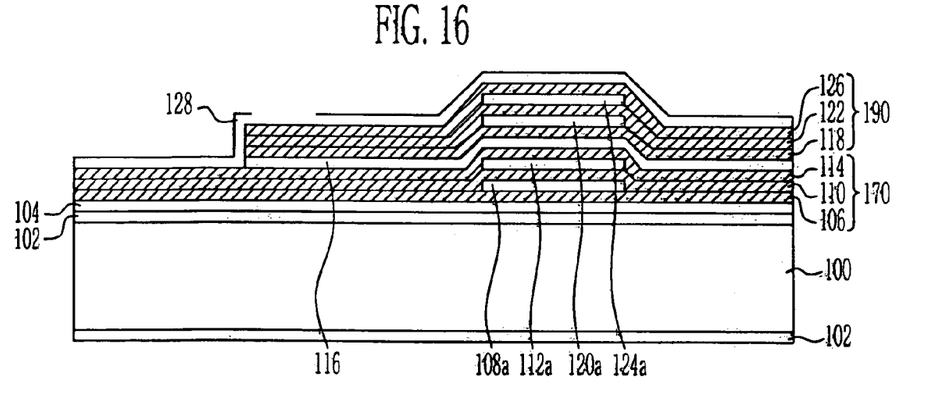

Referring to FIG. 16, in order to form an electrode pad (See '140' in FIG. 1) electrically connected with the third silicon film 114 in the lower mirror 180, the silicon films 126, 122, 118 forming the upper mirror 182 and the second sacrificial oxide film 116 are etched by a plasma etching method. Subsequently, a protective oxide film 128 for protecting the structure on the front side of the semiconductor substrate 100 when etching the rear side thereof is deposited.

Figure 17:
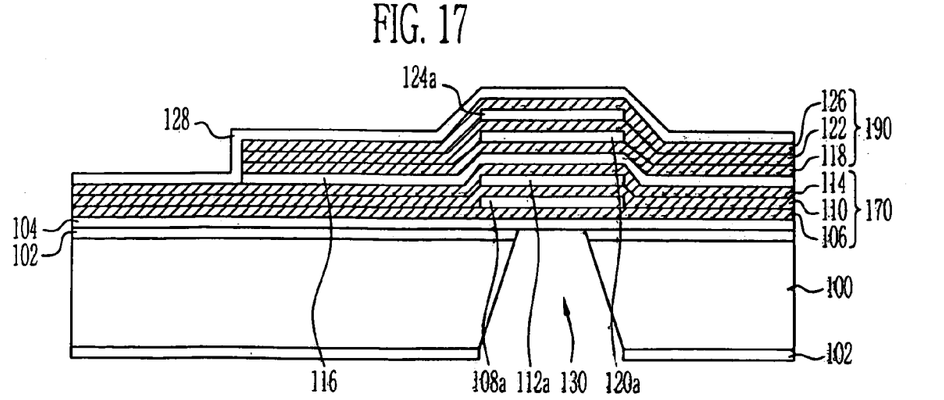

Referring to FIG. 17, the rear side of the semiconductor substrate 100 is etched. That is, a photoresist pattern defining an opening 130 for inserting an optical fiber thereinto is formed on the rear side of the semiconductor substrate 100. The thermal oxide film 102 on the rear side of the semiconductor substrate 100 is etched by using the photoresist pattern as an etching mask, and then the substrate is etched up to under the first sacrificial oxide film 104 below the lower mirror 180 in a wet etching method or a Deep RIE (Deep Reactive Ion etching) method using a silicon etching solution such as KOH, thereby the opening 130 for inserting the optical fiber 160 thereinto is formed. The Deep RIE method uses $SF_6$ gas and $C_4F_8$, gas.

Figure 18:
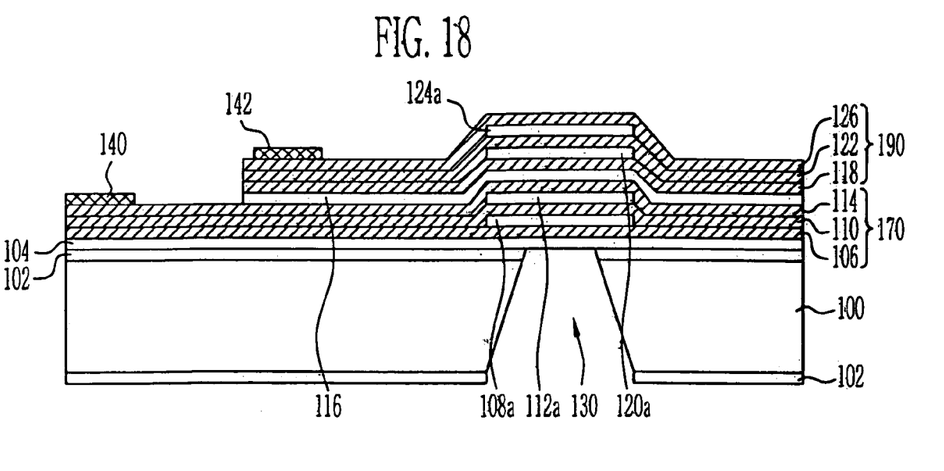

Referring to FIG. 18, after the opening 130 for inserting the optical fiber thereinto is formed in the rear side of the semiconductor substrate 100, the protective oxide film 128 formed on the front side of the semiconductor substrate 100 is removed. Subsequently, a conductive material is deposited on the sixth silicon film 126 and the third silicon film 114 and is patterned to form electrode pads 140, 142. The electrode pad 140, 142 are electrically connected with the top silicon films in the lower mirror 180 and the upper mirror 182, respectively, and the gap between the lower mirror 180 and the upper mirror 182 can be controlled by applying a voltage to the electrode pads 140, 142.

Figure 19:
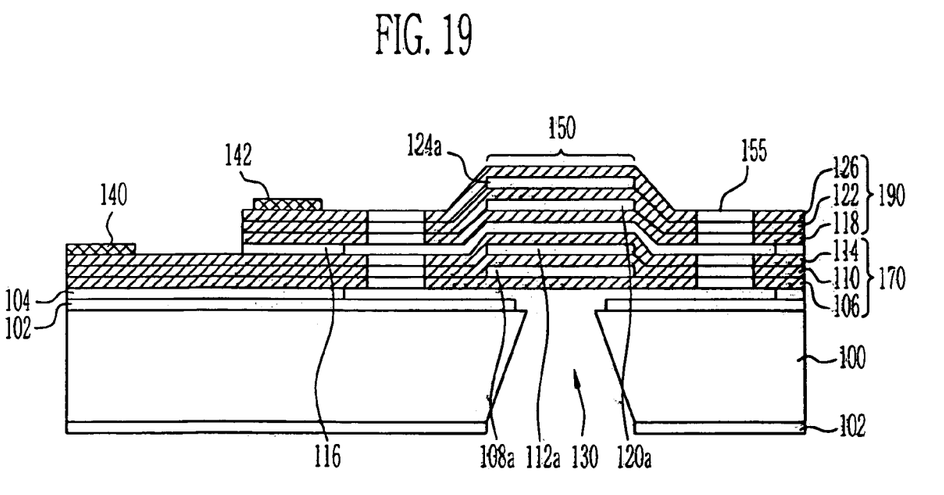

Referring to FIG. 19, the lower and upper mirrors 180, 182 having the laminated structure of the silicon film and the silicon oxide film is defined by a photolithography process in the pattern shape of the optical tuning mirror structure in FIG. 1. Subsequently, in order to form the mirror structure pattern suspended by the connection means 155, that is, the torsion bar or the spring, the etching process is performed until the first sacrificial oxide film 104. For example, the silicon film may be etched with a plasma RIE process by using $SF_4$ or $CF_4$ gas, and the silicon oxide film may be etched by using $CF_4$ gas or $CHF_6$ gas.

Next, the second sacrificial oxide film 116 and the first sacrificial oxide film 104 are removed by a wet etching method using a hydrogen fluoride solution or a gas phase etching (GPE) method using anhydrous hydrogen fluoride (HF). Since the wet etching method and the gas phase etching method has an isotropic etching characteristics, the second sacrificial oxide film 116 between the upper mirror 182 and the lower mirror 180 is removed to form the optical tuning space, and the first sacrificial oxide film 104 between the lower mirror 180 and the semiconductor substrate 100 is etched by the optical fiber inserting opening 130 so that the lower mirror 180 is spaced away from the semiconductor substrate 100 by a predetermined distance in a floating shape.

The tunable wavelength optical filter having Fabry-Perot structure in which a pair of mirrors 180, 182 having the optical reflective layer composed of the multi-layer laminated structure of the silicon film/silicon oxide film are driven by the electrostatic force can be manufactured.

On the other hand, without forming the lower mirror 180 and the upper mirror 182 in a pair, wafers or cut individual chips on each which only the lower mirror 180 is formed and which the steps of forming the electrode 140 and the optical fiber inserting opening 130 and removing the sacrificial oxide film 104 are performed are aligned and attached opposite to each other by a predetermined distance by using the spacer layer, thereby the tunable wavelength optical filter having Fabry-Perot structure can be manufactured. This structure will be further explained as follows: First, a sacrificial oxide film for floating a mirror is formed on a semiconductor substrate. At this time, before forming the sacrificial oxide film, thermal oxide films may be on the both sides of the semiconductor substrate. Subsequently, conductive silicon films and oxide patterns for defining the mirror region are sequentially laminated on the sacrificial oxide film and another conductive silicon film is laminated to form the mirror. Next, the rear side of the semiconductor substrate is etched to form the opening for inserting an optical fiber thereinto. Subsequently, an electrode pad for controlling the gap between the mirrors by the electrostatic force is formed. Next, the silicon film around the mirror is etched by a dry etching method to expose the sacrificial oxide film, so that the mirror is suspended by the connecting means. Subsequently, in order to float the mirror on the semiconductor substrate, the sacrificial oxide film is etched. Finally, two semiconductor substrates passed through the above-mentioned processes are prepared, and are attached to each other while sandwiching a spacer therebetween such that the mirrors of the semiconductor substrates are opposite to each other, thereby the tunable wavelength optical filter having the Fabry-Perot structure is completed.

Further, the electrode pads 140, 142 can be electrically connected to the top silicon film in the lower mirror 180 and the top silicon film in the upper mirror 182, respectively, to adjust the tuning gap. But, in an alternative method, the electrode pads can be formed in the silicon film forming the lower mirror 180 and the silicon substrate 100 to adjust the gap between the lower mirror and the substrate 100, thereby the micro-gap between the upper and the lower mirrors 182, 180 can be relatively adjusted.

In addition, both the upper mirror 182 and the lower mirror 180 are suspended by the connecting means 155, but the structure that only the upper mirror 182 is suspended by the connecting means 155 and the lower mirror 180 is not floated on the semiconductor substrate 100, that is, is embedded in the substrate can be formed. By performing the dry etching process performed to suspend the mirror by the connecting means 155 until the second sacrificial oxide film 116 is exposed, the structure that only the upper mirror 182 is suspended by the connecting means 155 is accomplished after etching the sacrificial oxide film 116.

According to the present invention, a multi-layer thin film mirror having a high optical reflectivity which comprised of the silicon film (polysilicon) and the silicon oxide film having a large optical reflectivity difference therebetween can be implemented on a silicon wafer, and an optical filter device floated on the substrate can be manufactured by using the high etching selectivity of the silicon oxide film and the silicon film. Particularly, the pattern except for the mirror region having the multi-layer laminated structure of the silicon film/silicon oxide film is formed by laminating the silicon films, thereby the tunable wavelength optical filter having the Fabry-Perot structure can be easily manufactured by only a general silicon semiconductor IC process. The present invention can manufacture the tunable wavelength optical filter by a surface micro-machining technique by using a basic technique of the silicon semiconductor process established already. In addition, the manufacturing structure and the process thereof is simple, thereby the bulk production is performed a consistent process at a low cost.

Further, according to the present invention, the consistent process using the semiconductor substrate can be performed by using general semiconductor processes and materials, and the tunable wavelength optical filter and an IC circuit for controlling and driving the same can be simultaneously integrated on one substrate, due to the compatibility with the semiconductor IC process.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, without departing from the spirit and scope of the present invention.

What is claimed is:

1. A tunable wavelength optical filter, comprising:
   a lower mirror in which silicon films and oxide films are sequentially laminated in a multi-layer and the silicon film is laminated on the top portion;
   an upper mirror in which silicon films and oxide films are sequentially laminated in multi-layer and the silicon film is laminated on the top portion and which is spaced away from said lower mirror by a predetermined distance;

a connecting means for connecting and suspending said lower mirror and said upper mirror to a semiconductor substrate; and electrode pads for applying voltage to said lower mirror and said upper mirror;

wherein the gap between the lower mirror and said upper mirror is controlled by driving the lower mirror and said upper mirror with an electrostatic force.

2. The tunable wavelength optical filter according to claim 1, wherein said lower mirror is composed of a first conductive silicon film/a first oxide film/a second silicon film/a second oxide film/a third conductive silicon film formed sequentially.

3. The tunable wavelength optical filter according to claim 1, wherein said lower mirror is composed of at least three layers in which the silicon film and the oxide film are sequentially formed and the conductive silicon film laminated on the top portion therein.

4. The tunable wavelength optical filter according to claim 1, wherein said upper mirror is composed of a first conductive silicon film/a first oxide film/a second silicon film/a second oxide film/a third conductive silicon film formed sequentially.

5. The tunable wavelength optical filter according to claim 1, wherein said upper mirror is composed of at least three layers in which the silicon film and the oxide film are sequentially formed and a conductive silicon film is laminated on the top portion therein.

6. The tunable wavelength optical filter according to claim 1, wherein said silicon film is formed so as to have a thickness of $(2m+1)\lambda/4n$ ($m=0, 1, 2, \ldots$), wherein $\lambda$ is a wavelength of the light source, and n is the optical refractive index of the silicon film.

7. The tunable wavelength optical filter according to claim 1, wherein said oxide film is formed so as to have a thickness of $(2m+1)\lambda/4n$ ($m=0, 1, 2, \ldots$), wherein $\lambda$ is a wavelength of a light source, and n is the optical refractive index of the oxide film.

8. The tunable wavelength optical filter according to claim 1, wherein said connecting means is a torsion bar or a spring composed of a silicon film.

9. The tunable wavelength optical filter according to claim 1, wherein said lower mirror is floated on said semiconductor substrate by a predetermined distance, and an opening is provided on the rear side of said semiconductor substrate corresponding to the lower mirror.

10. The tunable wavelength optical filter according to claim 1, wherein said lower mirror and said upper mirror are symmetrical to each other, and said lower mirror and said upper mirror have a circular plate shaped structure.

11. The tunable wavelength optical filter according to claim 1, wherein the region around said lower and upper mirrors is opened so as to expose said semiconductor substrate, such that said lower mirror and said upper mirror are suspended by said connecting means.

12. The tunable wavelength optical filter according to claim 1, wherein the region around said upper mirror is opened so as to expose the region around said lower mirror, such that upper mirror is suspended by said connecting means.

* * * * *